(12) United States Patent
Mertens et al.

(10) Patent No.: US 11,034,102 B2
(45) Date of Patent: Jun. 15, 2021

(54) PROCESS ARRANGEMENT AND A METHOD FOR PRODUCING A FIBER-REINFORCED PLASTIC COMPONENT

(71) Applicants: VOLKSWAGEN AKTIENGESELLSCHAFT, Wolfsburg (DE); BASF SE, Ludwigshafen (DE)

(72) Inventors: Thomas Mertens, Ehra-Lessien (DE); Max Ehleben, Braunschweig (DE); Christine Kunze, Meine (DE); Olaf Täger, Braunschweig (DE); Maurice Bitterlich, Meine (DE); Katja Zeuner, Braunschweig (DE); Philippe Desbois, Edingen (DE); Andreas Wollny, Ludwigshafen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 468 days.

(21) Appl. No.: 15/552,987

(22) PCT Filed: Feb. 15, 2016

(86) PCT No.: PCT/EP2016/000254
§ 371 (c)(1),
(2) Date: Aug. 23, 2017

(87) PCT Pub. No.: WO2016/134830
PCT Pub. Date: Sep. 1, 2016

(65) Prior Publication Data
US 2018/0065326 A1    Mar. 8, 2018

(30) Foreign Application Priority Data
Feb. 23, 2015    (DE) .................... 10 2015 002 106.0

(51) Int. Cl.
*B29C 70/50* (2006.01)
*B29C 70/46* (2006.01)
*B29B 17/00* (2006.01)

(52) U.S. Cl.
CPC .......... *B29C 70/46* (2013.01); *B29B 17/0005* (2013.01); *B29C 70/50* (2013.01); *B29B 2017/001* (2013.01)

(58) Field of Classification Search
CPC ......... B29C 70/46; B29C 70/50; B29C 70/38; B29C 70/504
See application file for complete search history.

(56) References Cited

U.S. PATENT DOCUMENTS 3,166,533 A    1/1965    Otto et al.
5,445,701 A    8/1995    Koba
(Continued)

FOREIGN PATENT DOCUMENTS

CN    101062595 A    10/2007
CN    101264667 A    9/2008
(Continued)

OTHER PUBLICATIONS

International Search Report of PCT Application No. PCT/EP2016/000254, dated Jun. 30, 2016.
(Continued)

*Primary Examiner* — Matthew J Daniels
(74) *Attorney, Agent, or Firm* — Pearl Cohen Zedek Latzer Baratz LLP

(57) ABSTRACT

A process arrangement and a process for the production of a fiber-reinforced plastics component made of at least one continuous-fiber-reinforced semifinished textile fiber product with reactive thermoplastic matrix material, where during the manufacture of the semifinished fiber product trimming residues ($m_R$, $m_A$) arise, composed of a composite
(Continued)

made of fibers and of the reactive thermoplastic matrix material, and during finishing of the finished plastics component final-trimming residues ($m_E$) arise, composed of a composite of fibers and of polymerized thermoplastic matrix material, and are further processed in a recycling unit to give a recyclate. The trimming residues arising during the manufacture of the semifinished fiber product are polymerized in a preparatory unit and then are delivered in the invention to the recycling unit.

7 Claims, 4 Drawing Sheets

(56) References Cited

U.S. PATENT DOCUMENTS

| | | | | |
|---|---|---|---|---|
| 2003/0116545 A1* | 6/2003 | Kaji | ............... | B23K 26/0604 |
| | | | | 219/121.72 |
| 2006/0073311 A1* | 4/2006 | Hogg | ............... | B29C 70/386 |
| | | | | 428/174 |
| 2015/0144253 A1* | 5/2015 | Zhang | ............... | B29C 70/50 |
| | | | | 156/148 |
| 2015/0283730 A1* | 10/2015 | Kakimoto | ............ | B29C 70/44 |
| | | | | 264/138 |

FOREIGN PATENT DOCUMENTS

| | | |
|---|---|---|
| DE | 18 13 980 A | 7/1969 |
| DE | 41 12 172 A1 | 8/1992 |
| DE | 10 2012 005 625 A1 | 9/2013 |
| EP | 0 443 051 A1 | 8/1991 |
| EP | 2 289 690 A2 | 3/2011 |
| EP | 2 642 007 A1 | 9/2013 |
| EP | 2 666 805 B1 | 11/2013 |
| WO | WO 03/053661 A1 | 7/2003 |
| WO | WO 2003/053661 A1 | 7/2003 |
| WO | WO 2011/056293 A1 | 5/2011 |
| WO | WO 2012/116947 A1 | 9/2012 |
| WO | WO 2013/056845 A2 | 4/2013 |
| WO | WO-2014069503 A1 * 5/2014 ............ B29B 11/12 |  |

OTHER PUBLICATIONS

Search report for German Patent Application No. 10 2015 002 106.0, dated Jul. 3, 2015.
Office Action for Chinese Patent Application No. 201680011481.3, dated Mar. 1, 2019.
Search report for German Patent Application No. 10 2015 002 107.9, dated Jun. 7, 2015.
Schinner et al., "Recycling Carbon-Fiber Reinforced Thermoplastic Composites", Journal of Thermoplastic Composite materials, vol. 9 (1996), pp. 239-245. 1996.
Non-Final Office Action for U.S. Appl. No. 15/552,939, dated Feb. 5, 2019.
Non-Final Office Action for U.S. Appl. No. 15/552,939, dated Jul. 2, 2019.
International Search Report of PCT Application No. PCT/EP2016/000252, dated Jun. 13, 2016.

* cited by examiner

PROCESS ARRANGEMENT AND A METHOD FOR PRODUCING A FIBER-REINFORCED PLASTIC COMPONENT

CROSS-REFERENCE TO RELATED APPLICATIONS

This application is a National Phase Application of PCT International Application No. PCT/EP2016/000254, International Filing Date Feb. 15, 2016, claiming priority of German Patent Application No. 10 2015 002 106.0, filed Feb. 23, 2015, which is hereby incorporated by reference in its entirety.

FIELD OF THE INVENTION

The invention relates to a process arrangement for the production of a fiber-reinforced plastics component, and also to a process for the production of this plastics component.

BACKGROUND OF THE INVENTION

The fiber-reinforced plastics components can be produced with the aid of semifinished textiles products known as prepregs. Reactive prepregs are produced by preimpregnating a textile fiber material with a reactive, i.e. as yet unpolymerized, thermoplastic matrix material at a temperature lower than a polymerization-initiation temperature. The fiber-reinforced plastics component is shaped by mutually superposing the prepregs in a stack to give a layer package in a lay-up procedure and subjecting this to a thermoforming process or press process.

WO 2012/116947 A1 discloses a process of this generic type for the production of reactive prepregs, i.e. of continuous-fiber-reinforced semifinished sheet products with polyamide matrix. The process begins by preimpregnating textile structures with a liquid starting component of the polyamide matrix, i.e. molten lactam inclusive of added catalysts and/or activators, and specifically in a continuous process. After impregnation, the preimpregnated continuous textile structure is trimmed to size in a cutting unit to give fiber-reinforced semifinished sheet products and mutually superposed in a stacking unit to give a stack. In the further course of the process, the preimpregnated semifinished textile products are transported to an assembly unit in which the semifinished textile products are mutually superimposed in a lay-up procedure and are cut to size in accordance with the final shape of the required component. The resultant layer package is then placed in a mold. Shaping then takes place, and specifically at a temperature above the polymerization-initiation temperature in a press procedure or thermoforming procedure. The preimpregnated lactam thus polymerizes to give a polyamide. The simultaneous thermoforming/pressing converts the fiber-reinforced semifinished sheet product into the intended shape of the required component finishing.

Final trimming of the finished plastics component can then take place in a finishing unit, specifically with formation of final-trimming residues, composed of a composite of fibers and of the polymerized matrix material. The final-trimming residues can be delivered to a recycling unit, and can be further processed there to give a recyclate for uses in an injection-molding or press process, as indicated by way of example in EP 2 666 805 B1. Accordingly, it is possible, by simple comminution and extrusion, to introduce components based on a thermoplastic matrix into new uses in the injection-molding sector. The fundamental advantage of fiber-composite materials based on a thermoplastic matrix here consists in excellent recycling properties. Simple melting and regranulation results in homogeneous mixing of the fibers and the matrix. The resultant recycled granulate can be reused as a high-quality feedstock for a very wide variety of applications.

The problematic part of the process sequence outlined above is that residues—additional to the final-trimming residue mentioned—are also produced at earlier junctures in the process: edge-trimming residues (from the trimming-to-size of the semifinished fiber products) and assembly-trimming residues. Unlike the final-trimming residue, the edge-trimming residues and the assembly-trimming residues have not yet been polymerized, and cannot therefore be further processed in the abovementioned recycling process. The edge-trimming residues and assembly-trimming residues are therefore diverted from the process sequence as non-recyclable waste material.

SUMMARY OF THE INVENTION

The object of the invention consists in providing a process arrangement, and also a process, which can produce a fiber-reinforced plastics component and which, in comparison with the prior art, involves an improved recycling concept.

The object of the invention has been achieved via the features of the independent claims. The dependent claims disclose preferred embodiments of the invention.

DETAILED DESCRIPTION OF THE INVENTION

The invention additionally associates a preparatory unit with the recycling unit. Trimming residues made of a composite of fibers and of thermoplastic matrix material that has not yet been polymerized, i.e. is reactive, can be delivered to the preparatory unit. The reactive thermoplastic matrix material is first polymerized in the preparatory unit, and then the resultant composite made of fibers and of polymerized matrix material is delivered to the recycling unit. The composite material delivered from the preparatory unit is further processed together with the final-trimming residues in the recycling unit to give the recyclate that is suitable for uses in injection-molding processes or press processes.

A relevant point in respect of fully satisfactory polymerization in the preparatory unit is that the trimming residues that have not yet been polymerized do not come into contact with the environment, i.e. do not undergo reaction with atmospheric moisture, oxygen, UV radiation or the like that would impair their processability, in particular the polymerization reaction. In order to avoid any such disadvantageous reaction with the environment, the trimming residues can be dried and/or stored and transported under conditions that exclude air, light and/or moisture until they are processed in the preparatory unit. The polymerization of the trimming residues takes place in an oven, for example in a tunnel oven.

In a manufacturing plant, at least one continuous web made of a textile structure can be preimpregnated with a liquid starting component of the reactive, thermoplastic matrix material in a manufacturing unit in a continuous process. After impregnation, edge-trimming takes place in which the preimpregnated continuous structure is trimmed to size in a cutting unit to give the continuous-fiber-reinforced semifinished textile fiber products (reactive prepregs)

with reactive, i.e. as yet unpolymerized, thermoplastic matrix material. The trimming to size takes place with formation of edge-trimming residues, composed of a composite made of fibers and of reactive thermoplastic matrix material. For reasons related to manufacturing technology, the fibers in the edge-trimming residues have not been completely wetted by the matrix material. Indeed, matrix material may be entirely absent in some parts of the edge-trimming residues. Accordingly, the proportion of fiber in the edge-trimming residues is very high.

In the further course of the process, the reactive prepregs are mutually superposed in a stacking, to give a stack, and stored, and transported as required to an assembly unit. In the assembly unit, the prepregs are by way of example first mutually superposed in layers to give a layer package in a lay-up procedure. An assembly trimming procedure can then take place in which the layer package is cut to size in accordance with a final shape of the fiber-reinforced plastics component. This takes place with formation of assembly-trimming residues, composed of a composite made of fibers and of reactive thermoplastic matrix material. Unlike the edge-trimming residues, the assembly-trimming residues are completely surrounded by matrix material, i.e. fully impregnated, and the proportion of fiber is therefore comparatively high, corresponding to the proportion of fiber in a finished fiber-reinforced plastics component.

In an alternative to this, it is also possible that the assembly trimming procedure takes place first and is followed by the lay-up procedure.

In a design variant, the reactive prepregs can have an exterior component edge which forms a projecting rim required for the press procedure and/or thermoforming procedure. Once a press procedure and/or thermoforming procedure has taken place, the said rim has no function and can therefore be removed from the finished plastics component in the finishing unit, and specifically with formation of final-trimming residues. Perforations, cutouts or the like can also be incorporated at the same time in the finishing unit, and these likewise produce final-trimming residues which can be delivered to the recycling unit. The proportion of fiber in the projecting rim removed from the plastics component can be the same as the proportion of fiber in the finished plastics component. The proportion of fiber in the projecting rim removed can also sometimes be smaller, and specifically by virtue of overflow of excess matrix material during the shaping of the plastics component in the press mold/thermoforming mold.

A polymerized matrix material with no fiber content can be added to trimming residues passed into the recycling unit in accordance with the required fiber volume content of the recyclate to be produced in the recycling unit. Associated with the preparatory unit and/or the recycling unit, there can moreover be a comminution unit, for example a granulator in which the trimming residues that can be combined to give the recyclate can be comminuted. The edge-trimming residues, and also the assembly-trimming residues, can preferably be polymerized before processing in the granulator. It is also possible, if necessary, that the final-trimming residue is mixed in various ratios by weight with the assembly-trimming residue and/or the edge-trimming residue in each case upstream of or downstream of the granulator, and only then is delivered to the recycling unit. The further processing of the short- or long-fiber-reinforced, polymerized trimming residues then takes place therein.

The conditions in which the other mentioned trimming residues, arising in defined different process units, are present at the time of cutting to size differ in respect of degree of polymerization and of fiber volume content.

Reactive thermoplastic matrix material used is preferably caprolactam (known as casting PA). Examples of reactive thermoplastic matrix system rather than caprolactam are laurolactam and cyclic butylene terephthalate, etc. Fiber material can be any of the possible fibers. It is preferable to use fibers made of glass, carbon, basalt, aramid, or to use a combination of these. The arrangement of these can vary greatly, examples being woven fabric, laid scrim and a unidirectional material. Polymerization of caprolactam uses a reaction temperature of about 150° C., at which caprolactam produces the polyamide (PA6). For other reactive materials, for example laurolactam giving PA12 or CBT giving PBT, temperatures appropriate to the respective material must be selected.

The advantageous inventive embodiments explained above and/or provided in the dependent claims can—except when by way of example there are clear dependencies or there are alternatives that cannot be combined—be used individually or in any desired combination with one another.

BRIEF DESCRIPTION OF THE DRAWINGS

The invention and its advantageous embodiments, and also advantages thereof, are explained in more detail below with reference to drawings.

DETAILED DESCRIPTION OF THE INVENTION

Figure 1:
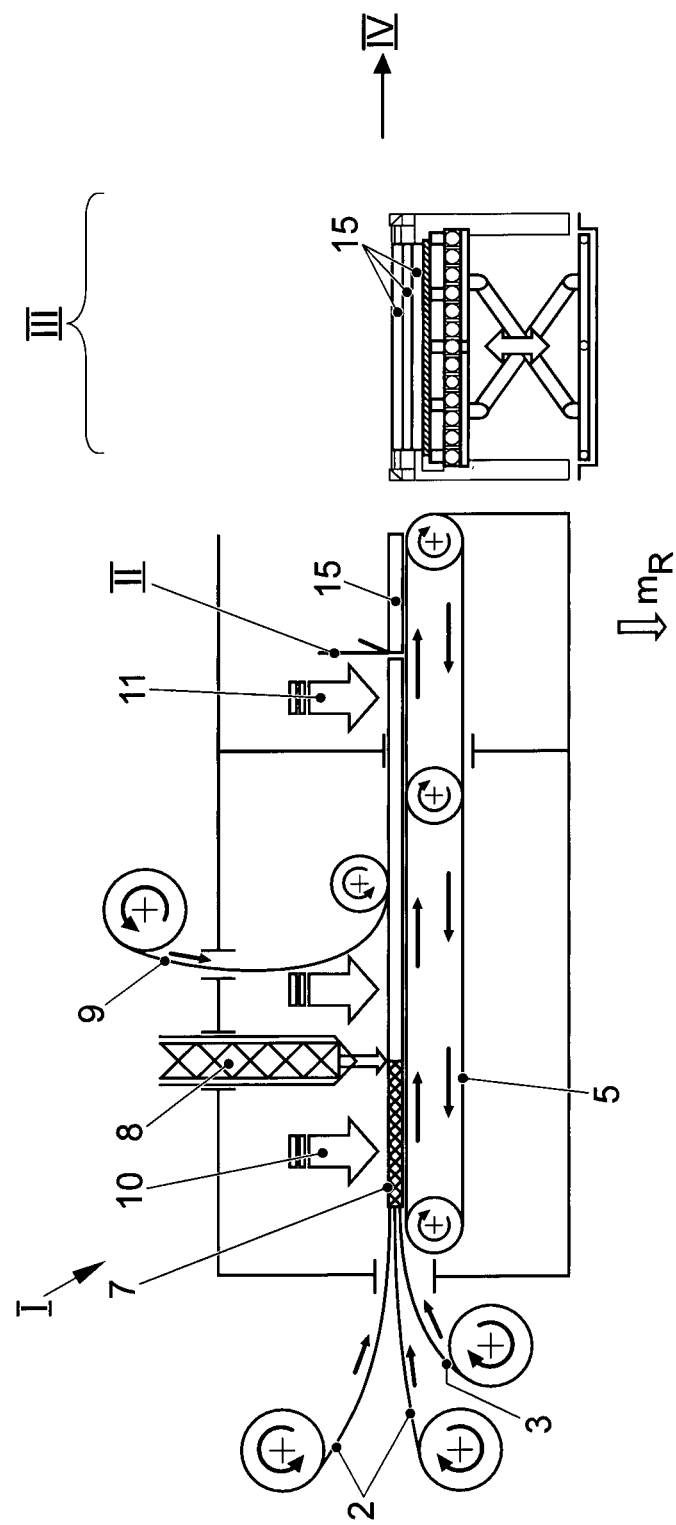
FIGS. 1 to 4 in each case show process units for the production of the fiber-reinforced plastics component.

FIGS. 1 to 4 depict the process units I to VI for the production of a fiber-reinforced plastics component 1 (FIGS. 3 and 4) to the extent required for understanding the invention. Accordingly, a manufacturing unit I first by way of example brings two fiber layers 2 onto a continuous transport belt 5 in a continuous process with insertion therebetween of a first film 3 made of, for example, polyamide or of another suitable material. The resultant textile layer structure 7 is saturated with a starting component 8 of a reactive thermoplastic matrix material, for example lactam, and specifically with exposure to heat 10 at a temperature below the initiation temperature for polymerization of the starting component of the reactive thermoplastic matrix material.

In the further course of the process, a second film 9 is also then applied, and the textile layer structure 7 is cooled in a cooling unit 11 (i.e. consolidated), and also trimmed to size in a downstream cutting unit II to give individual preimpregnated semifinished textile fiber products 15. In the cutting unit II, edge trimming takes place in which the prepregnated continuous structure 7 is cut to size to give the continuous-fiber-reinforced semifinished textile fiber products 15 (for which the term prepregs is also used below). FIG. 1 indicates only the cutting-to-length procedure. Edge trimming takes place in FIG. 1 at right angles to the cutting-to-length procedure in the plane of the drawing.

An edge-trimming residue $m_R$ is thus produced, composed of a composite made of fibers and of reactive (i.e. as yet unpolymerized) thermoplastic matrix material. The edge-trimming residue $m_R$ is diverted from the process sequence as waste material. The fibers in the edge-trimming residue $m_R$ have not been completely wetted by the reactive matrix material, or are present in the absence of any matrix material, the proportion of fiber in the edge-trimming residue $m_R$ therefore being very high.

Figure 2:
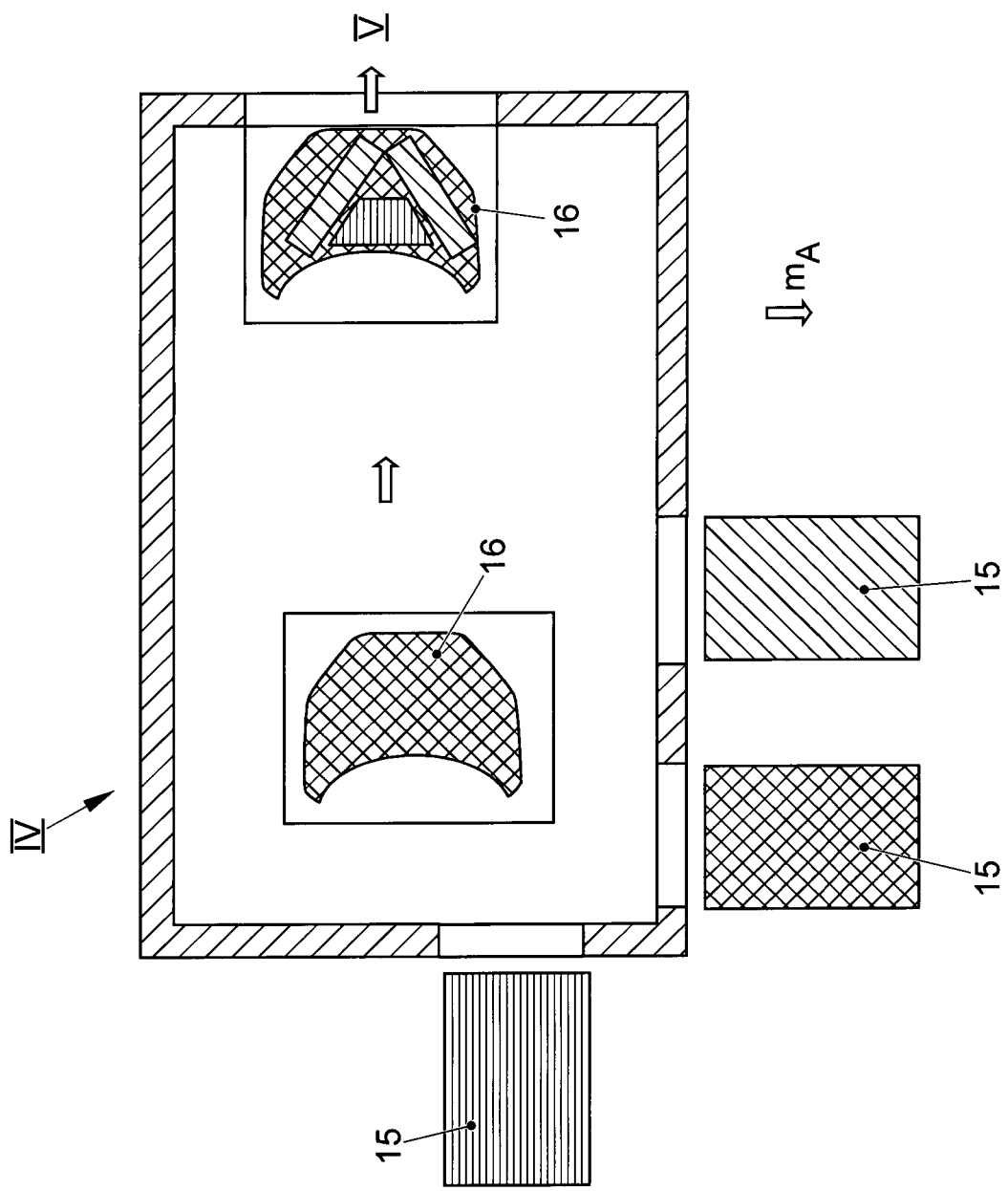

The trimmed-to-size semifinished textile fiber products 15 are mutually superposed in a subsequent stacking unit III to give a stack, and are stored. The semifinished fiber products 15 mutually superposed in a stack are transferred as required to an assembly unit IV, which is downstream in the process and is indicated in FIG. 2. In the assembly unit IV the preimpregnated semifinished textile fiber products 15 are cut to size and mutually superposed in layers to give a layer package 16 (FIG. 2). The prepreg 15 mutually superposed in layers to give the layer package 16 are moreover cut to size in accordance with the loading requirements placed upon the finished plastics component 1. This results in further waste material, which is diverted from the process sequence as assembly-trimming residue $m_A$. The assembly-trimming residue $m_A$ is composed of a composite made of fibers and of reactive thermoplastic matrix material. The fibers in the assembly-trimming residue $m_A$, unlike those in the edge-trimming residue $m_R$ are completely surrounded by matrix material, i.e. are fully impregnated. The proportion of fiber in the assembly-trimming residue $m_A$ is therefore higher than in the edge-trimming residue $m_R$ and in essence is the same as the proportion of fiber in the finished plastics component 1.

Figure 3:
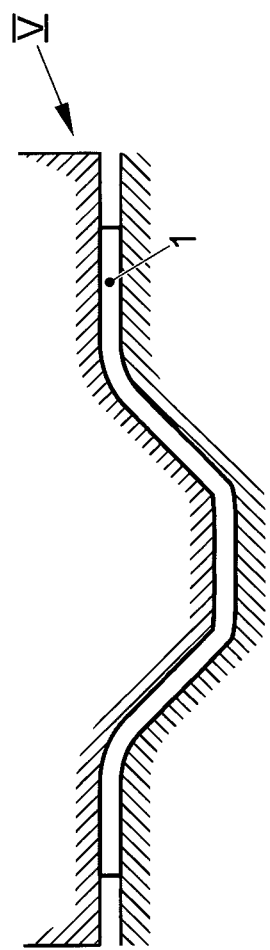
Figure 4:
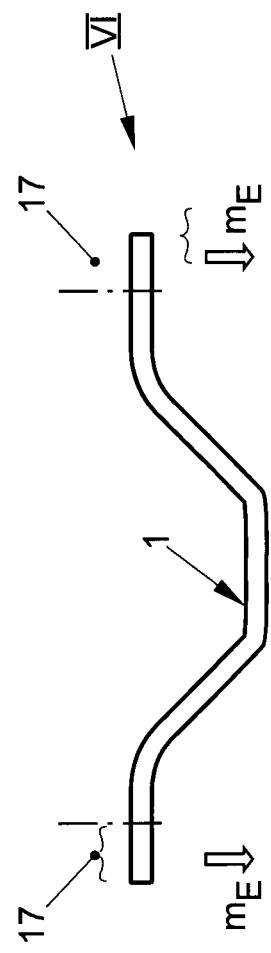

In the further course of the process, the layer package 16 is transferred to the press unit and/or thermoforming unit V indicated in broad terms in the diagram of FIG. 3, in which the layer package 16 is heated to a temperature above the polymerization temperature and at the same time is thermoformed/pressed to give the shape of the required plastics component 1. In a finishing unit VI (FIG. 4), which is downstream in the process, the plastics component 1 is subjected to edge-trimming in which by way of example an exterior component edge 17 required for the thermoforming procedure is removed from the plastics component 1, and specifically with formation of a final-trimming residue $m_E$, composed of a composite made of fibers and of polymerized matrix material.

Figure 5:
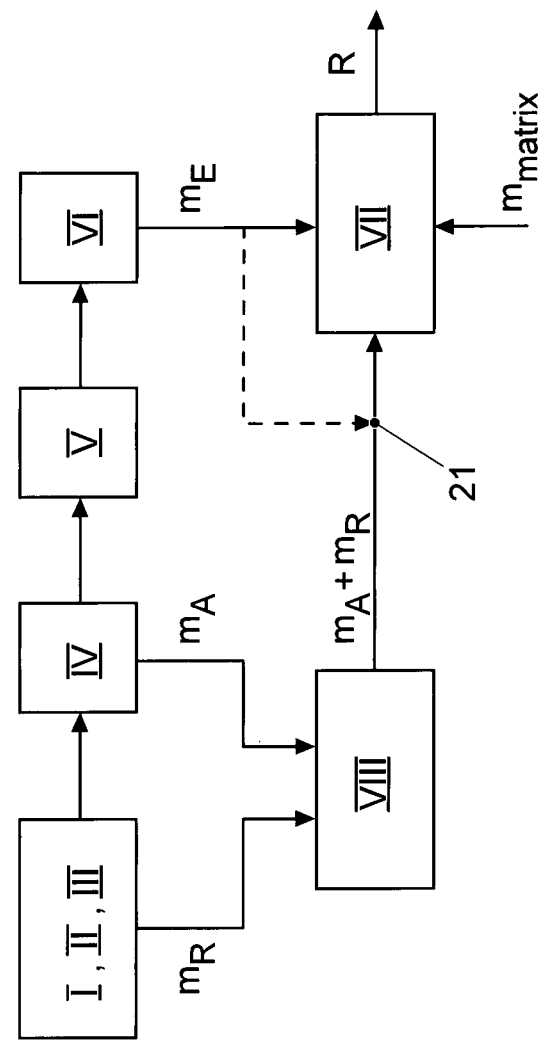
FIG. 5 is a block diagram of the process sequence inclusive of a recycling unit and of an associated preparatory unit.

Downstream of the process sequence I to VI for the production of the plastics component 1 in FIG. 5 there is a recycling unit VII into which the final-trimming residues $m_E$ are passed. In the recycling unit VII there can, where appropriate, be a granulator arranged which comminutes the final-trimming residues $m_E$. The final-trimming residues $m_E$ are further processed in the recycling unit VII to give a recyclate R that is suitable for use in an injection-molding or press process.

As is further apparent from FIG. 5, there is a preparatory unit VIII associated with the recycling unit VII. The edge-trimming residues $m_R$ and the assembly-trimming residues $m_A$ can be delivered to the preparatory unit VIII. The two trimming residues $m_R$, $m_A$ are composed of a composite made of fibers with reactive (i.e. as yet unpolymerized) thermoplastic matrix material, and are therefore not directly processable in the recycling unit VII to the recyclate R.

The reactive thermoplastic matrix material of the two trimming residues $m_R$, $m_A$ is polymerized in the preparatory unit VII. The resultant composite made of fibers and of polymerized matrix material is then combined in the recycling unit VII with the final-trimming residues $m_E$, and is further processed therein.

Alternatively and/or additionally, it is also possible that the preparatory unit VIII comprises a granulator in which the trimming residues $m_R$ and $m_A$ are comminuted. Processing of the edge-trimming residues and of the assembly-trimming residues $m_R$, $m_A$ in the granulator preferably takes place only after these have been polymerized.

As indicated by a broken line in FIG. 5, it is possible in an alternative design variant that the final-trimming residue $m_E$ is combined with the polymerized trimming residues $m_A$, $m_R$ at a collection point 21 upstream of the recycling unit VII, and it is then passed onward into the recycling unit VII. It is moreover possible that, if necessary because of the required fiber volume content of the recyclate R, polymerized matrix material is also added to the respective trimming residues $m_R$, $m_A$ $m_E$ in order, where appropriate, to reduce the proportion of fiber in the recyclate R.

It is additionally possible to add admixtures to the recyclate R produced in the recycling unit VII. In the further course of the process, the recyclate R can be plastified, and also delivered to a screw-based extruder, and then processed in the injection-molding or press process.

The invention claimed is:

1. A process arrangement for the production of a fiber-reinforced plastics component, comprising:
   a manufacture and assembly unit configured to preimpregnate at least one continuous web made of a textile structure with a liquid starting component of the reactive thermoplastic matrix material in the manufacturing unit in a continuous process, wherein the manufacture and assembly unit includes a first cutter configured to edge-trim the at least one preimpregnated continuous web resulting in edge-trimming residues, wherein the edge trimming residues are made of a composite of fibers and of the reactive thermoplastic matrix material,
   a press unit and/or thermoforming unit in which the continuous-fiber-reinforced semifinished textile fiber product with reactive thermoplastic matrix material is heated to a temperature above the polymerization temperature and at the same time can be pressed and/or thermoformed into a shaped plastics component,
   a finishing unit having a second cutter configured to edge-trim the shaped plastics component thereby forming final-trimming residues made of a composite of fibers and of the polymerized matrix material,
   a preparatory unit having an oven configured to polymerize the edge-trimming residues, and
   a recycling unit having a granulator configured to comminute the final-trimming residues and the polymerized edge-trimming residues, thereby forming recyclate for use in an injection-molding or press process.

2. The process arrangement according to claim 1, wherein, in the assembly unit, the continuous-fiber-reinforced semifinished textile fiber product can be mutually superposed in layers to give a layer package in a lay-up procedure and/or the assembly unit includes a third cutter configured to cut to size the continuous-fiber-reinforced semifinished textile fiber product in accordance with a final shape of the shaped plastics component, with formation of an assembly-trimming residue composed of the composite made of fibers and of reactive thermoplastic matrix material.

3. The process arrangement according to claim 2, wherein:
   the fiber contents in the final-trimming residue and in the assembly-trimming residue are identical, and
   the fiber content in the edge-trimming residue is lower than that in the final-trimming or assembly-trimming residue, and a polymerized matrix material can be added to the trimming residue passed into the recycling unit in accordance with the required fiber volume content of the recyclate.

4. The process arrangement according to claim 1, wherein the continuous-fiber-reinforced semifinished textile fiber product has an exterior component edge which is required for the press procedure and/or thermoforming procedure and which forms a projecting rim that can be removed from the shaped plastics component in the finishing unit, with formation of the final-trimming residue.

5. The process arrangement according to claim 1, wherein perforations or cutouts can be incorporated into the shaped plastics component in the finishing unit, with formation of the final-trimming residue.

6. The process arrangement according to claim 1,
wherein the assembly unit includes a third cutter configured to cut to size the continuous-fiber-reinforced semifinished textile fiber product, thereby forming an assembly-trimming residue composed of the composite made of fibers and of reactive thermoplastic matrix material,
wherein the oven of the preparatory unit is further configured to polymerize the assembly-trimming residue,
wherein the granulator is further configured to comminute the polymerized assembly-trimming residue, and
wherein the recyclate is formed by combining the comminuted final-trimming residues, comminuted polymerized edge-trimming residues, and comminuted polymerized assembly-trimming residue.

7. The process arrangement according to claim 6, wherein the final-trimming residue can be mixed in various ratios by weight with the assembly-trimming residue and/or the edge-trimming residue, in each case upstream or downstream of the granulator.

* * * * *